United States Patent
Carames et al.

(10) Patent No.: US 9,692,711 B2
(45) Date of Patent: Jun. 27, 2017

(54) DNS REDIRECTING FOR DATA ROAMING OFFERING

(71) Applicant: Verizon Patent and Licensing Inc., Arlington, VA (US)

(72) Inventors: Miguel A. Carames, Martinez, CA (US); Amol Tuli, Dublin, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 251 days.

(21) Appl. No.: 14/578,857

(22) Filed: Dec. 22, 2014

(65) Prior Publication Data
US 2016/0182402 A1    Jun. 23, 2016

(51) Int. Cl.
*H04L 12/927* (2013.01)
*H04L 29/12* (2006.01)

(52) U.S. Cl.
CPC ........ *H04L 47/808* (2013.01); *H04L 61/1511* (2013.01); *H04L 61/1588* (2013.01); *H04L 61/203* (2013.01)

(58) Field of Classification Search
CPC . H04L 47/808; H04L 61/1511; H04L 61/203; H04L 61/1588
See application file for complete search history.

(56) References Cited

U.S. PATENT DOCUMENTS

| | | | | |
|---|---|---|---|---|
| 2001/0049790 A1* | 12/2001 | Faccin | ................. | H04L 63/104 713/185 |
| 2006/0123470 A1* | 6/2006 | Chen | ...................... | H04L 63/08 726/5 |
| 2006/0245406 A1* | 11/2006 | Shim | ................... | H04L 63/0272 370/338 |
| 2009/0172138 A1* | 7/2009 | Wang | ............... | H04L 29/12066 709/223 |
| 2009/0196265 A1* | 8/2009 | Mariblanca Nieves | .................. | H04W 8/065 370/338 |
| 2010/0211628 A1* | 8/2010 | Shah | ..................... | H04W 48/17 709/203 |
| 2011/0105115 A1* | 5/2011 | Li | ........................... | H04L 63/08 455/432.1 |
| 2012/0100832 A1* | 4/2012 | Mao | ...................... | H04W 12/06 455/411 |
| 2012/0151568 A1* | 6/2012 | Pieczul | .............. | H04L 63/0815 726/8 |
| 2012/0185578 A1* | 7/2012 | Perkuhn | .................. | H04W 8/06 709/223 |

* cited by examiner

*Primary Examiner* — Philip Chea
*Assistant Examiner* — Wuji Chen

(57) ABSTRACT

A device may receive a request for domain name system (DNS) information to be provided to a user device communicating via a visited network. The device may identify roaming policy information associated with the user device and, based on the roaming policy information, may determine that the user device is restricted from sending or receiving data via the visited network. The device may determine DNS information, to be provided to the user device, that includes information that identifies a restricted DNS server to which the user device is to be directed. The device may provide the DNS information to the user device to cause the user device to be directed to the restricted DNS server. The user device may be directed to the restricted DNS server to permit a user of the user device to authorize the user device to send or receive data via the visited network.

20 Claims, 12 Drawing Sheets

DNS REDIRECTING FOR DATA ROAMING OFFERING

BACKGROUND

The Domain Name System (DNS) is a hierarchical distributed naming system for devices (e.g., servers, computers, etc.) connected via a network, such as the Internet. A DNS server may be configured to translate a domain name into a network address, such as an Internet protocol (IP) address, for the purpose of communicating with a device associated with the domain name, such as a server device that hosts a web site.

DETAILED DESCRIPTION OF PREFERRED EMBODIMENTS

The following detailed description of example implementations refers to the accompanying drawings. The same reference numbers in different drawings may identify the same or similar elements.

Use of a data roaming service by a user device (e.g., allowing the user device to send and/or receive data via a visited network) may be perceived by a subscriber (e.g., a user of the user device) as an expensive service. As such, "bill shock prevention" may be desirable for the subscriber as well as a service provider associated with the user device. One technique that the service provider may implement in order to achieve this is to allow the subscriber to authorize and/or enable data roaming service on an as needed basis. For example, if the user wishes for the user device to receive data roaming service associated with a visited network (e.g., a network that is not a home network associated with the user device), the user may be prompted (e.g., via the user device) to authorize data roaming up to a particular amount of data usage, enable data roaming for a particular period of time, or the like. The ability to allow the user to authorize and/or enable data roaming service via a message provided to the user device (e.g., a short message service (SMS) message, an unstructured supplementary service data (USSD) message, etc.) may be undesirable (e.g., due to message size constraints, user interface limitations, etc.).

One solution that may be implemented by the service provider in order to allow the user to authorize and/or enable data roaming service is to direct the user device to a portal device associated with the service provider. The portal device may communicate with the user (e.g., via a portal user interface displayed by the user device) that allows the user to authorize and/or enable data roaming service for the user device. However, existing solutions, associated with directing the user device to the portal device, may use a packet inspection technique (e.g., deep packet inspection (DPI)) in order to determine when the user device is communicating via a visited network (i.e., when the user device should be directed to the portal device). The use of the packet inspection technique may have undesirable effects, such as increasing a packet processing requirement within the network, introducing latency to communication associated with the user device, increasing subscriber privacy concerns, requiring additional computing resources, or the like. Implementations described herein may allow a user device to be directed to a portal device, associated with authorizing and/or enabling data roaming service for the user device, based on DNS information provided to the user device and determined based on a roaming policy corresponding to the user device (e.g., without relying on a packet inspection technique).

Figure 1A:
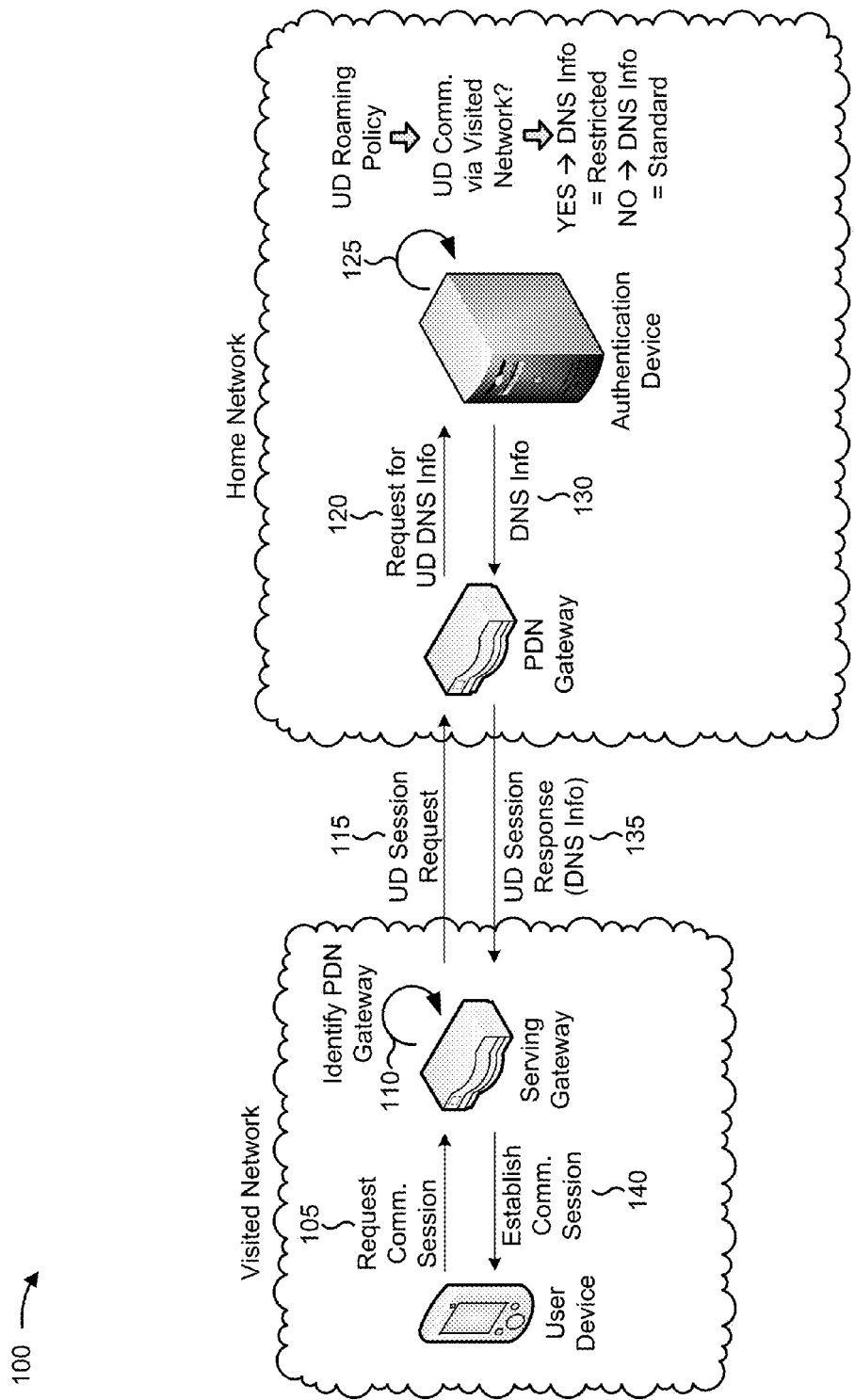
FIGS. 1A and 1B are diagrams of an overview of an example implementation described herein.
Figure 1B:
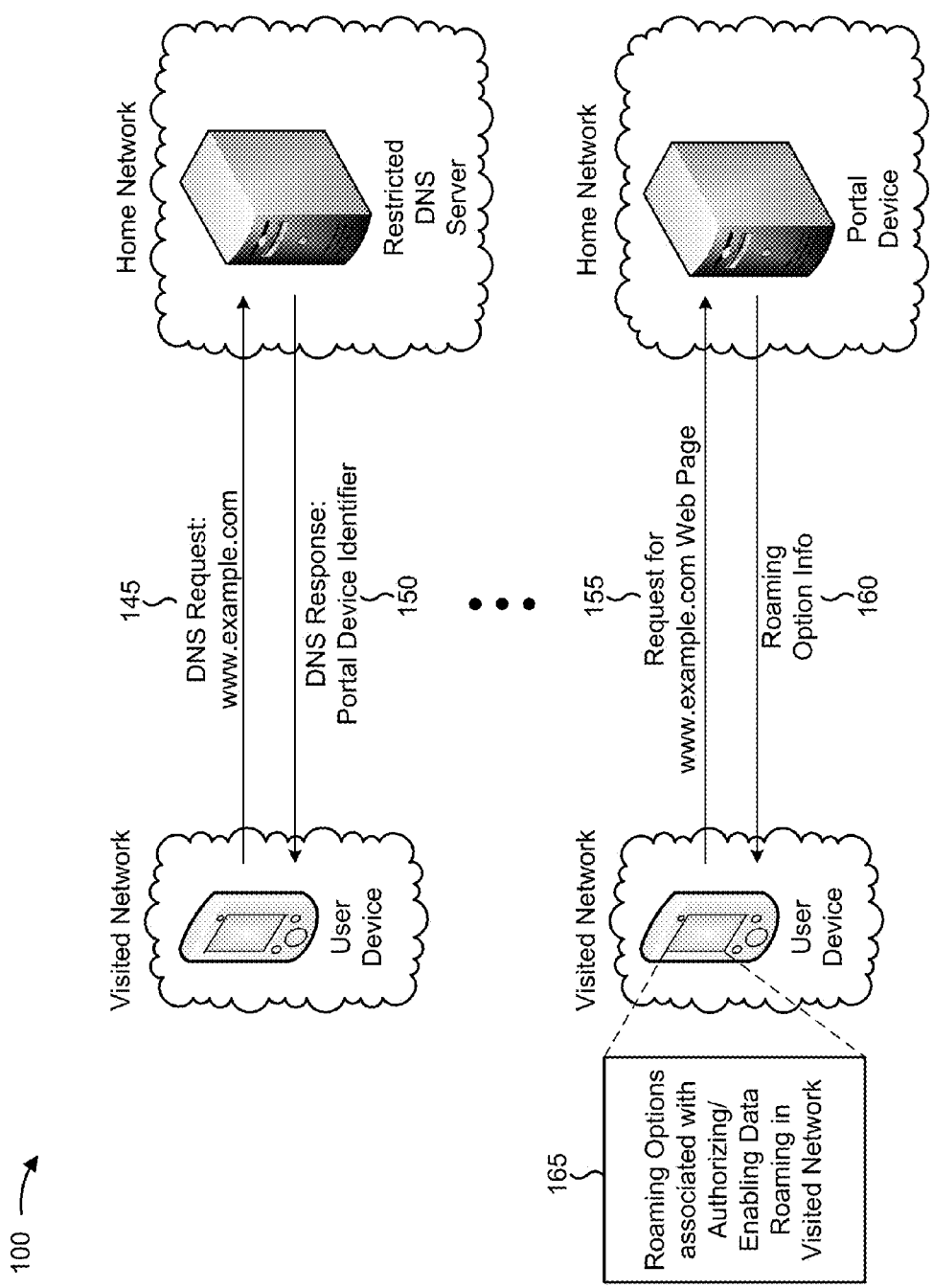

FIGS. 1A and 1B are diagrams of an overview of an example implementation 100 described herein. For the purposes of example implementation 100, assume that a user device has received information (e.g., user input) indicating that the user device is to initiate a communication session that allows the user device to send and/or receive data via visited network (i.e., when the user device is located within a geographical area associated with the visited network and is located outside of a geographical area associated with a home network of the user device).

As shown in FIG. 1A, and by reference number 105, the user device may provide, to a serving gateway associated with the visited network, an indication associated with establishing the communication session. As shown by reference number 110, the serving gateway may identify (e.g., based on information that identifies the user device and based on communicating with other devices) a packet data network (PDN) gateway associated with the home network of the user device (e.g., via which the user device may send and/or receive data). As shown by reference number 115, the serving gateway may provide, to the PDN gateway, a session request that includes information associated with the user device (e.g., a user device identifier, an access point name (APN) associated with the user device, etc.). As shown by reference number 120, the PDN gateway may send, to an authentication device associated with the home network, a request for DNS information associated with the user device. The request for DNS information may include information that identifies the user device, and information that identifies the visited network via which the user device is attempting to establish the communication session.

As shown by reference number 125, the authentication device may receive the request for DNS information, and may identify (e.g., based on the information that identifies the user device and information stored by the authentication device) a roaming policy corresponding to the user device.

The authentication device may then determine (e.g., based on the roaming policy information that identifies the visited network) whether the user device is permitted to communicate via the visited network under the roaming policy corresponding to the user device. As further shown, if the authentication device determines that the user device is not permitted to communicate via the visited network under the roaming policy, then the authentication device may determine (e.g., based on information stored by the authentication device) DNS information that identifies a restricted DNS server to which the user device is to be directed. In some implementations, the restricted DNS server may be used to direct the user device to a portal device associated with authorizing and/or enabling data roaming for the visited network, as described below. Alternatively, if the authentication device determines that the user device is permitted to communicate via the visited network under the roaming policy, then the authentication device may determine DNS information that identifies a standard DNS server to which the user device is to be directed. In some implementations, the standard DNS server may allow the user device to communicate via the visited network in a standard fashion (e.g., since the user device is permitted to communicate via the visited network).

As shown by reference number 130, the authentication device may provide the DNS information to the PDN gateway. As shown by reference number 135, the PDN gateway may generate a response to the session request that includes the DNS information determined by the authentication device, and may provide the session response to the serving gateway. As shown by reference number 140, the serving gateway may receive the session response, and may establish the communication session with the user device. The serving gateway may provide the DNS information to the user device during establishment of the communication session.

For the purposes of FIG. 1B, assume that the authentication device has determined that the user device is not permitted to communicate via the visited network under the roaming policy and, as such, the DNS information received by the user device includes information that identifies a restricted DNS server to which the user device is to be directed. Further, assume that the user device has received an indication associated with communication via the visited network (e.g., user input associated with accessing a www.example.com web page). As shown by reference number 145, the user device may provide, to the restricted DNS server, a DNS request associated with the web page. As shown by reference number 150, the restricted DNS server may receive the DNS request, and may generate a DNS response that includes information that identifies the portal device associated with authorizing and/or enabling data roaming for the visited network.

As shown by reference number 155, upon receiving the DNS response, the user device may provide, to the portal device, a request associated with the web page. As shown by reference number 160, the portal device may receive the request, and may provide, to the user device, a response that includes roaming option information associated with authorizing and/or enabling data roaming for the visited network. As shown by reference number 165, the user device may receive the response, and may provide the roaming option information for display to the user. As shown, the roaming option information may allow the user to authorize and/or enable data roaming in the visited network. In some implementations, the user may select one or more roaming options (e.g., identified by the roaming option information) in order to authorize and/or enable data roaming within the visited network. The user device may then communicate with the portal device in order to authorize and/or enable data roaming, and after the authorization and/or activation is complete, the user device may communicate via the visited network (e.g., in a standard fashion).

In this way, a user device may be directed to a portal device, associated with authorizing and/or enabling data roaming service for the user device, based on DNS information provided to the user device and determined based on a roaming policy corresponding to the user device (e.g., without relying on a packet inspection technique).

Figure 2:
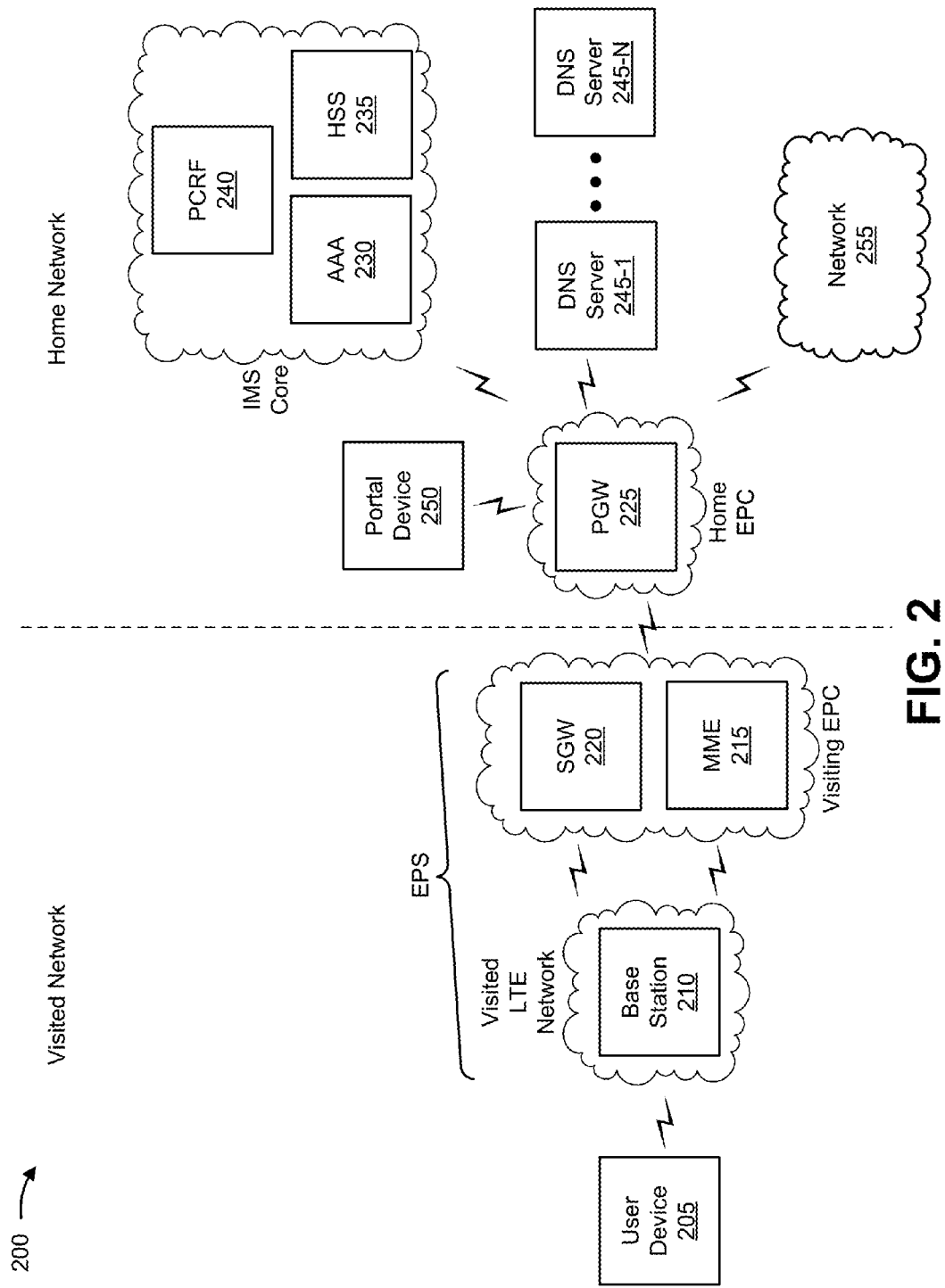
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 205, a base station 210, a mobility management entity device (MME) 215, and a serving gateway (SGW) 220. As shown, user device 205, base station 210, MME 215, and SGW 220 may be located in a visited network (e.g., a network that is not a home network associated with the user device). As further shown in FIG. 2, environment 200 may include a packet data network gateway (PGW) 225, an authentication, authorization, and accounting server (AAA) 230, a home subscriber server (HSS) 235, a policy and charging rules function server (PCRF) 240, one or more domain name system (DNS) servers 245-1 through 245-N (N≥1) (hereinafter referred to collectively as DNS servers 245, and individually as DNS server 245), and a portal device 250. As shown, PGW 225, AAA 230, HSS 235, PCRF 240, DNS server 245, and portal device 250 may be included in the home network associated with user device 205. As further shown, environment 200 may also include a network 255. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include a visited network (e.g., a roaming network, a network other than a home network of user device 205, etc.) and a home network. As shown, the visited network of environment 200 may include an evolved packet system (EPS) that includes a visited LTE network and/or a visited evolved packet core (EPC) that operate based on a third generation partnership project (3GPP) wireless communication standard. The visited LTE network may include a radio access network (RAN) that includes one or more base stations 210 that take the form of evolved Node Bs (eNBs) via which user device 205 communicates with the visited EPC. The visited EPC may include MME 215 and SGW 220 that enables user device 205 to communicate with a home EPC (e.g., including PGW 225), network 255, and/or an Internet protocol (IP) multimedia subsystem (IMS) core. The IMS core may include AAA 230, HSS 235 and/or PCRF 240, and may manage device registration and authentication, session initiation, etc., associated with user device 205. AAA 230, HSS 235 and/or PCRF 240 may reside in the home EPC and/or the IMS core.

User device 205 may include one or more devices capable of communicating with one or more devices of (e.g., base station 210, SGW 220, PGW 225, DNS server 245, portal device 250, etc.) of environment 200 and/or one or more other devices (e.g., one or more devices included in network 255). For example, user device 205 may include a wireless communication device, a radiotelephone, a personal communications system (PCS) terminal (e.g., that may combine a cellular radiotelephone with data processing and data communications capabilities), a personal digital assistant (PDA), a mobile phone, a smart phone, a laptop computer, a tablet computer, a personal gaming system, and/or a similar device. User device 205 may send traffic to and/or receive traffic from network 255 (e.g., via base station 210, SGW 220, and/or PGW 225).

Base station 210 may include one or more devices capable of transferring traffic, such as audio, video, text, and/or other traffic, destined for and/or received from user device 205. In some implementations, base station 210 may include an eNB associated with the visited LTE network that receives traffic from and/or sends traffic to network 255 via SGW 220 and/or PGW 225. Additionally, or alternatively, one or more base stations 210 may be associated with a RAN that is not associated with the visited LTE network. Base station 210 may send traffic to and/or receive traffic from user device 205 via an air interface. In some implementations, base station 210 may include a small cell base station, such as a base station of a microcell, a picocell, and/or a femtocell.

MME 215 may include one or more devices, such as one or more server devices, capable of managing authentication, activation, deactivation, and mobility functions associated with user device 205. In some implementations, MME 215 may perform operations relating to authentication of user device 205. Additionally, or alternatively, MME 215 may facilitate the selection of a particular SGW 220 and/or a particular PGW 225 to serve traffic to and/or from user device 205. MME 215 may perform operations associated with handing off user device 205 from a first base station 210 to a second base station 210 when user device 205 is transitioning from a first cell associated with the first base station 210 to a second cell associated with the second base station 210. Additionally, or alternatively, MME 215 may select another MME, to which user device 205 should be handed off (e.g., when user device 205 moves out of range of MME 215).

SGW 220 may include one or more devices capable of routing packets. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the visited LTE network, and may send the aggregated traffic to network 255 (e.g., via PGW 225) and/or other network devices associated with the visited EPC and/or the home IMS core. SGW 220 may also receive traffic from network 255 and/or other network devices, and may send the received traffic to user device 205 via base station 210. Additionally, or alternatively, SGW 220 may perform operations associated with handing off user device 205 to and/or from another LTE network.

PGW 225 may include one or more devices capable of providing connectivity for user device 205 to external packet data networks (e.g., other than the depicted visited EPC and/or visited LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 255. Additionally, or alternatively, PGW 225 may receive traffic from network 255, and may send the traffic to user device 205 via SGW 220 and base station 210. In some implementations, PGW 225 may be capable of assigning (e.g., based on IP pool information stored or accessible by PGW 225) a network address (e.g., an IP address) to user device 205.

AAA 230 may include one or more devices, such as one or more server devices, that perform authentication, authorization, and/or accounting operations for communication sessions associated with user device 205. For example, AAA 230 may perform authentication operations for user device 205 and/or a user of user device 205 (e.g., using one or more credentials), may control access, by user device 205, to a service and/or an application (e.g., based on one or more restrictions, such as time-of-day restrictions, location restrictions, single or multiple access restrictions, read/write restrictions, etc.), may track resources consumed by user device 205 (e.g., a quantity of voice minutes consumed, a quantity of data consumed, etc.), and/or may perform similar operations. In some implementations, AAA 230 may be capable of identifying (e.g., based on roaming policy information stored or accessible by AAA 230) a particular DNS server 245 to which user device 205 is to be directed and/or an IP pool from which user device 205 is to be assigned a network address.

HSS 235 may include one or more devices, such as one or more server devices, capable of managing (e.g., receiving, generating, storing, processing, and/or providing) information associated with user device 205. For example, HSS 235 may manage subscription information associated with user device 205, such as information that identifies a subscriber profile of a user associated with user device 205, information that identifies services and/or applications that are accessible to user device 205, location information associated with user device 205, a network identifier (e.g., a network address) that identifies user device 205, information that identifies a treatment of user device 205 (e.g., quality of service information, a quantity of minutes allowed per time period, a quantity of data consumption allowed per time period, etc.), and/or similar information. HSS 235 may provide this information to one or more other devices of environment 200 to support the operations performed by those devices.

PCRF 240 may include a device, such as a server, capable of determining and/or enforcing policy rules. In some implementations, PCRF 240 may establish quality of service and charging (e.g., packet accounting) rules for a communication session based on committed quality of service levels per user, per terminating device, per service type, per application, or the like. PCRF server 240 may receive input (e.g., from the IMS core) regarding users, user device 205, subscriptions associated with user device 205, or the like. PCRF 240 may create quality of service and charging policy rules for the session (e.g., for a user, user device 205, etc.), and may provide the policy rules to PGW 225, which may handle packets for the communication session with user device 205 based on the policy rules.

DNS server 245 may include one or more devices, such as one or more server devices, capable of providing a response to a query of a directory including one or more network addresses. For example, DNS server 245 may include a device capable of determining, storing, receiving, and/or sending information that identifies a network address associated with another device (e.g., portal device 250, an application server, a web server, etc.).

In some implementations, DNS server 245 may be a restricted DNS server. A restricted DNS server may include a DNS server 245 configured to direct user device 205 to portal device 250 (e.g., regardless of information included in a DNS query received by restricted DNS server 245). Alternatively, DNS server 245 may be a standard DNS server. A standard DNS server may include a DNS server 245 configured to respond to a DNS query, provided by user device 205, based on information included in the DNS query (e.g., in a standard fashion).

Portal device 250 may include one or more devices, such as one or more server devices, capable of receiving, generating, storing, processing, and/or providing roaming option information associated with authorizing and/or enabling data roaming for user device 205 in a visited network. In some implementations, portal device 250 may be capable of communicating with one or more devices (e.g., user device 205, AAA 230, HSS 235, PCRF 240, etc.) in order to update subscription information, associated with user device 205, such that user device 205 may send and/or receive data via the visited network.

Network 255 may include one or more wired and/or wireless networks. For example, network 255 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
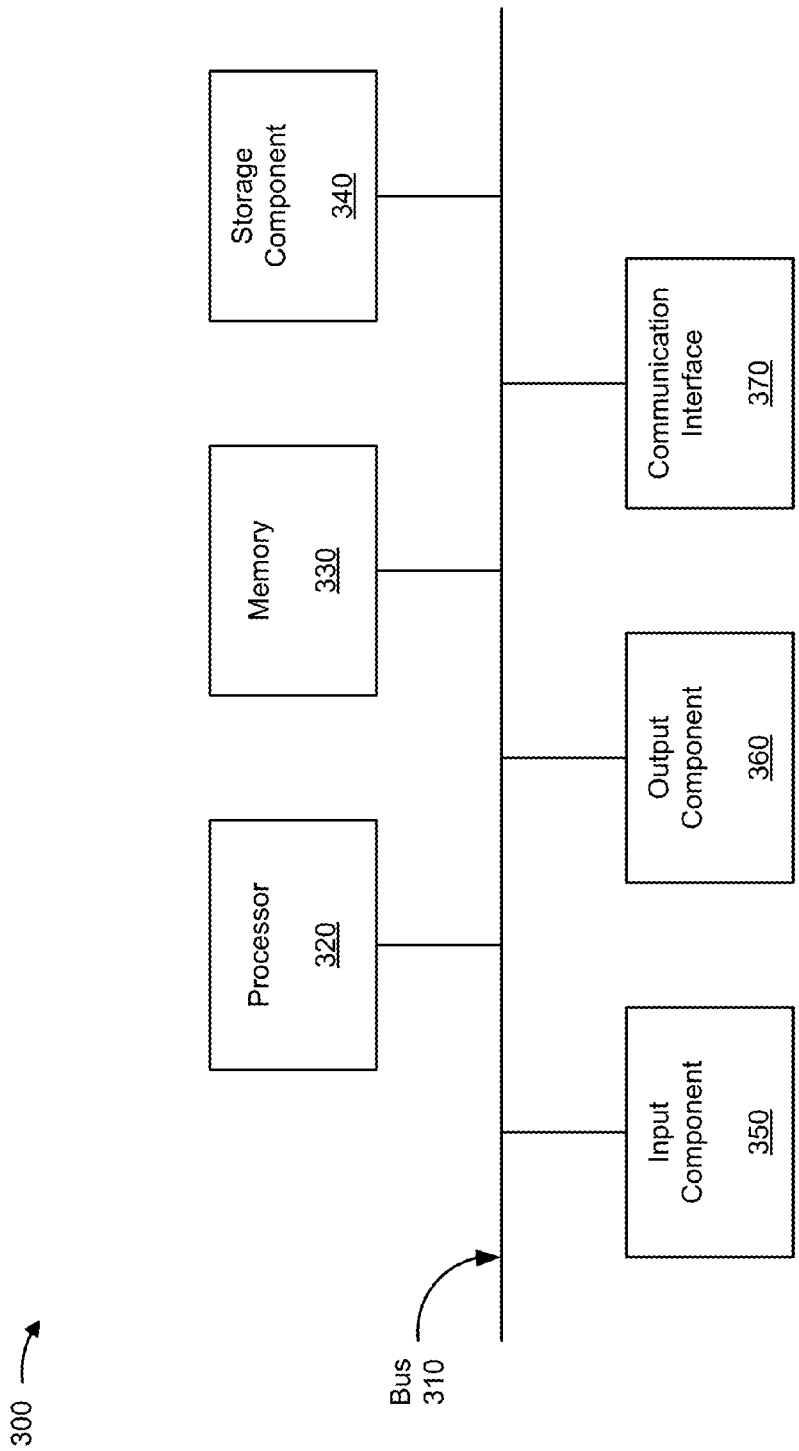
FIG. 3 is a diagram of example components of one or more devices of FIG. 2.

FIG. 3 is a diagram of example components of a device 300. Device 300 may correspond to user device 205, base station 210, MME 215, SGW 220, PGW 225, AAA 230, HSS 235, PCRF 240, DNS server 245, and/or portal device 250. In some implementations, user device 205, base station 210, MME 215, SGW 220, PGW 225, AAA 230, HSS 235, PCRF 240, DNS server 245, and/or portal device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
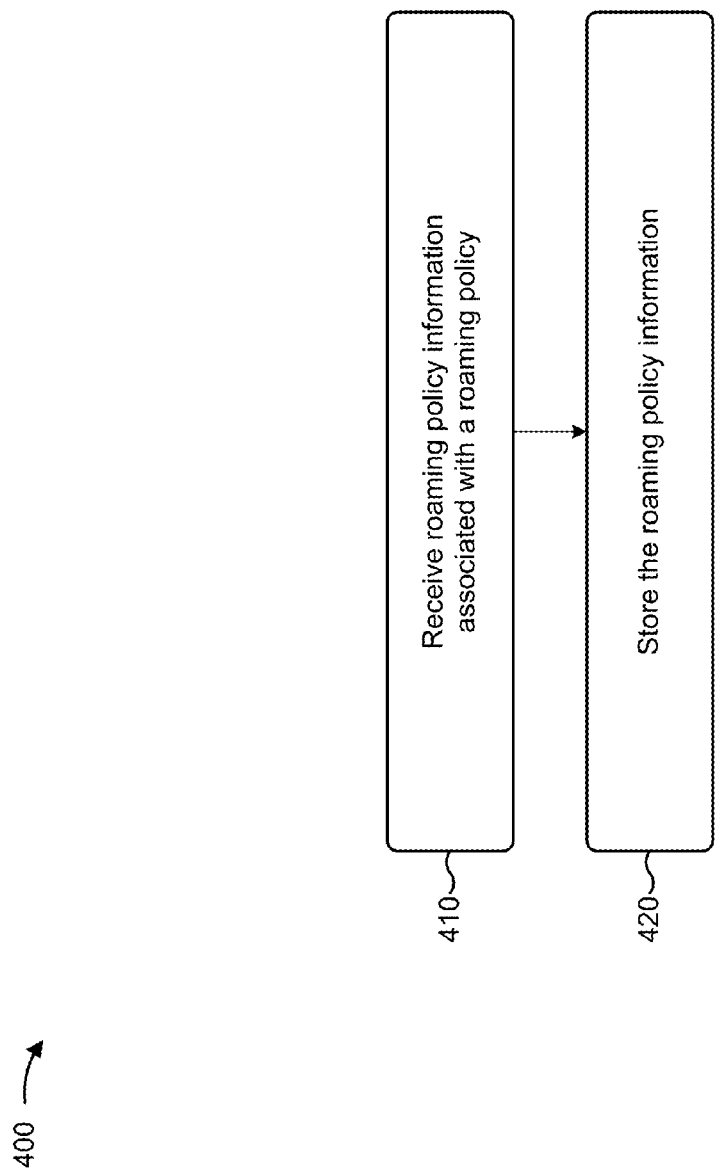
FIG. 4 is a flow chart of an example process for receiving and storing roaming policy information associated with a roaming policy.

FIG. 4 is a flow chart of an example process 400 for receiving and storing roaming policy information associated with a roaming policy. In some implementations, one or more process blocks of FIG. 4 may be performed by AAA 230. Additionally, or alternatively, one or more process blocks of FIG. 4 may be performed by another device or a group of devices separate from or including AAA 230, such as HSS 235 and/or PCRF 240.

As shown in FIG. 4, process 400 may include receiving roaming policy information associated with a roaming policy (block 410). For example, AAA 230 may receive roaming policy information associated with a roaming policy. In some implementations, AAA 230 may receive the roaming policy information when the roaming policy information is provided by another device (e.g., another device associated with the service provider). Additionally or alternatively, AAA 230 may receive the roaming policy information when AAA 230 receives (e.g., from an administrator associated with the service provider) user input associated with the roaming policy.

Roaming policy information may include information associated with a roaming policy that identifies one or more visited networks via which user device 205 may receive data roaming service. In some implementations, the roaming policy information may include information that identifies the roaming policy (e.g., a roaming policy name, a roaming policy tier, a roaming policy label, a roaming policy number, etc.). Additionally, or alternatively, the roaming policy information may include information (e.g., a network name, a mobile country code (MCC), a mobile network code (MNC), a visited public land mobile network identifier (VPLMN ID)) that identifies one or more visited networks, associated with the roaming policy, via which user device 205 is permitted to receive data roaming service (e.g., a visited network white list). Additionally, or alternatively, the roaming policy information may include information that identifies one or more visited networks, associated with the roaming policy, via which user device 205 is restricted from receiving data roaming service (e.g., a visited network black list).

In some implementations, the roaming policy information may also include information (e.g., a device identifier, an IP address, etc.) that identifies a restricted DNS server 245 (e.g., a primary restricted DNS server 245, a backup restricted DNS server 245) to which user device 205 is to be directed when user device 205 is restricted from sending and/or receiving data via a visited network via which user device 205 wishes to communicate. Additionally, or alternatively, the roaming policy information may include information that identifies a restricted network address pool associated with the roaming policy (e.g., an IP address pool from which user device 205 is to be assigned an IP address when user device 205 is restricted from sending and/or receiving data via the visited network).

Additionally, or alternatively, the roaming policy information may also include information that identifies a standard DNS server 245 (e.g., a primary standard DNS server 245, a backup standard DNS server 245) to which user device 205 is to be directed when user device 205 is permitted to send and/or receive data via a visited network via which user device 205 wishes to communicate. Additionally, or alternatively, the roaming policy information may include information that identifies a standard network address pool associated with the roaming policy (e.g., an IP address pool from which user device 205 is to be assigned an IP address when user device 205 is permitted to send and/or receive data via the visited network). Additionally, or alternatively, the roaming policy information may include another type of information associated with the roaming policy.

As further shown in FIG. 4, process 400 may include storing the roaming policy information (block 420). For example, AAA 230 may store the roaming policy information. In some implementations, AAA 230 may store the roaming policy information when AAA 230 receives the roaming policy information (e.g., after AAA 230 receives the roaming policy information). Additionally, or alternatively, AAA 230 may store the roaming policy information based on information, indicating that AAA 230 is to store the roaming policy information, received from another device.

In some implementations, AAA 230 may store the roaming policy information in a memory location (e.g., a RAM, a ROM, a cache, a hard disk, etc.) of AAA 230. Additionally, or alternatively, AAA 230 may provide the roaming policy information to another device for storage. For example, AAA 230 may provide the roaming policy information to HSS 235 and/or PCRF 240 for storage.

In some implementations, AAA 230 may store information associated with the roaming policy information such that previous roaming policy information (e.g., roaming policy information received at an earlier time) are supplemented, overwritten, and/or deleted. Additionally, or alternatively, AAA 230 may store the roaming policy information such that AAA 230 may retrieve the roaming policy information at a later time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
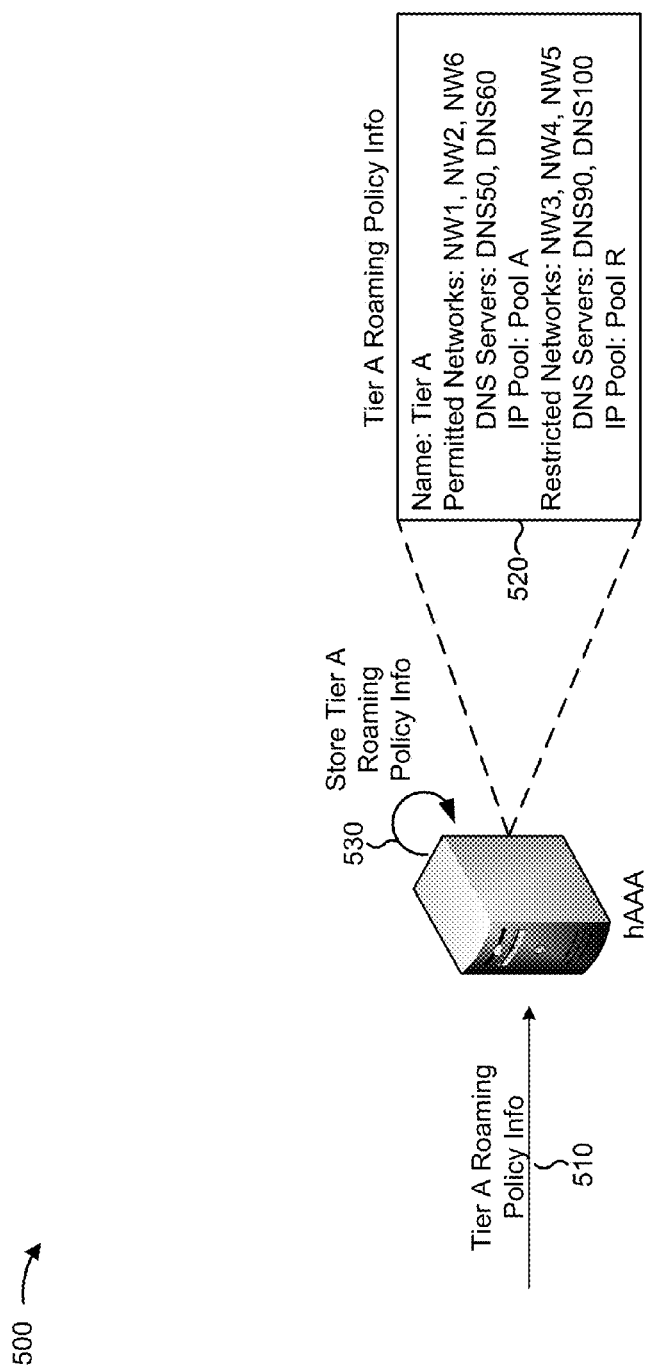
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that AAA 230 (e.g., hAAA) is associated with a home network of user device 205. As shown in FIG. 5, and by reference number 510, hAAA may receive (e.g., from another device associated with the home network) roaming policy information associated with a roaming policy (e.g., tier A).

As shown by reference number 520, the tier A roaming policy information may include information that identifies the roaming policy (e.g., Name: Tier A). As further shown, the tier A roaming policy information may also include information that identifies a group of visited networks via which user devices 205, assigned to the roaming policy, are permitted to send and/or receive data (e.g., Permitted Networks: NW1, NW2, NW6). As shown, the tier A roaming policy information may also include information that identifies a set of standard DNS servers 245 to which user devices 205, when communicating via a permitted network, are to be directed (e.g., DNS Servers: DNS50, DNS60). As further shown, the tier A roaming policy information may also include information that identifies an IP pool from which user devices 205, when communicating via a permitted network, are to be assigned an IP address (e.g., IP Pool: Pool A).

As further shown, the tier A roaming policy information may also include information that identifies a group of visited networks via which user devices 205, assigned to the roaming policy, are restricted from sending and/or receiving data (e.g., Restricted Networks: NW3, NW4, NW5). As shown, the tier A roaming policy information may also include information that identifies a set of restricted DNS servers 245 to which user devices 205, when communicating via a restricted network, are to be directed (e.g., DNS Servers: DNS90, DNS100). As further shown, the tier A roaming policy information may also include information that identifies an IP pool from which user devices 205, when communicating via a restricted network, are to be assigned an IP address (e.g., IP Pool: Pool R). As shown by reference number 530, hAAA may store the roaming policy information associated with the tier A roaming policy.

As indicated above, FIG. 5 is provided merely as an example. Other examples are possible and may differ from what was described with regard to FIG. 5.

Figure 6A:
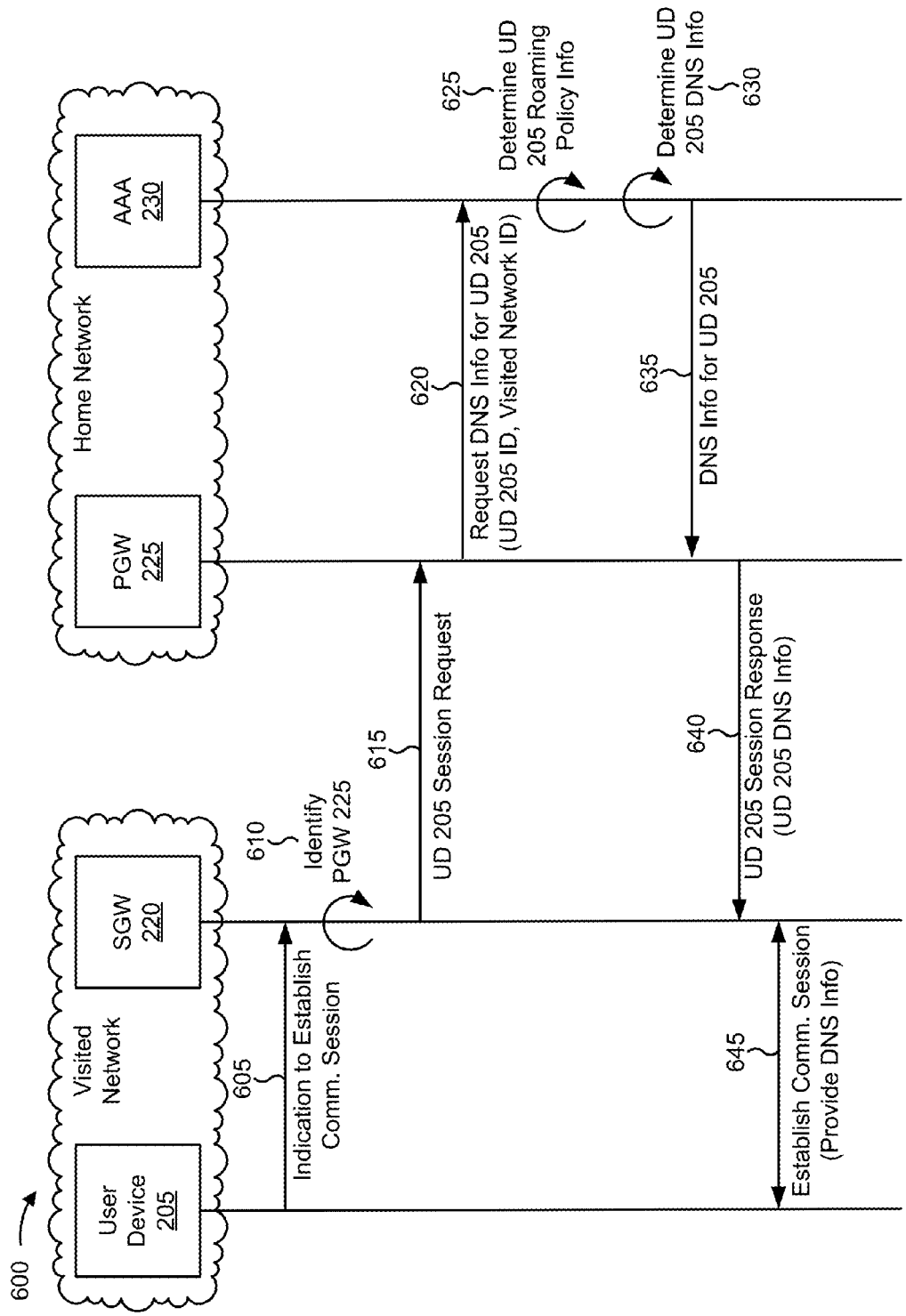
FIG. 6A is a call flow diagram of an example process for determining DNS information to be provided to a user device communicating via a visited network, and providing the DNS information to the user device.

FIG. 6A is a call flow diagram of an example process 600 for determining DNS information to be provided to a user device communicating via a visited network, and providing the DNS information to the user device. In some implementations, one or more operations of FIG. 6A may be performed by one or more devices of environment 200.

As shown in FIG. 6A, process 600 may include receiving an indication to establish a communication session associated with a user device and a visited network (as shown by reference number 605). For example, SGW 220 may receive an indication to establish a communication session associated with user device 205 and a visited network. In some implementations, SGW 220 may receive the indication when the indication is provided by user device 205. Additionally, or alternatively, SGW 220 may receive the indication when the indication is provided by another device, such as another device included in the visited network.

In some implementations, user device 205 may provide the indication based on user input. For example, the user may provide user input (e.g., that causes a web browser to be opened, that causes an application to be executed, etc.) indicating that user device 205 is to establish a communication session in order to allow user device 205 to send and/or receive data, and user device 205 may (e.g., automatically) provide the indication based on receiving the user input. Additionally, or alternatively, user device 205 may provide the indication based on a configuration of user device 205 (e.g., if user device 205 is configured to establish a communication session when user device 205 is powered on, then user device 205 may provide the indication when user device is powered on, etc.). Additionally, or alternatively, user device 205 may provide the indication at another time.

In some implementations, the indication may include information that identifies user device 205. For example, the indication may include a user device name, a device identification number (e.g., an international mobile subscriber identity (IMSI), a mobile subscriber integrated services digital network (MSISDN), etc.), or the like. Additionally, or alternatively, the indication may include other information associated with establishing a communication session via the visited network, such as an APN associated with user device 205.

As further shown in FIG. 6A, process 600 may include identifying a gateway device associated with a home network of the user device (as shown by reference number 610). For example, SGW 220 may identify PGW 225 associated with a home network of user device 205. In some implementations, SGW 220 may identify PGW 225 after SGW 220 receives the indication to establish the communication session associated with user device 205 and the visited network.

In some implementations, SGW 220 may identify PGW 225 based on information associated with user device 205. For example, SGW 220 may send, to another device included in the visited network, a query (e.g., a DNS query) associated with identifying PGW 225. Here, the query may include the information that identifies user device 205 (e.g., the IMSI, the APN, etc.). In this example, SGW 220 may receive, based on a response to the query, the information that identifies PGW 225. In some implementations, SGW 220 may identify PGW 225 in another manner (e.g., based on information stored by SGW 220).

As further shown in FIG. 6A, process 600 may include providing, to the identified gateway device, a session request associated with the user device (as shown by reference number 615). For example, SGW 220 may provide, to PGW 225, a session request associated with user device 205. In some implementations, SGW 220 may provide the session request after SGW 220 identifies PGW 225.

In some implementations, the session request may include information associated with establishing the communication session between user device 205 and the home network of user device 205 via the visited network. For example, the session request may include the information that identifies user device 205 (e.g., the IMSI, the APN, etc.), information that identifies the visited network (e.g., a network name, a MCC, a MNC, a VPLMN ID, etc.), and/or other information associated with establishing the communication session. In some implementations, SGW 220 may provide the session request such that the session request is received by PGW 225 associated with the home network of user device 205.

As further shown in FIG. 6A, process 600 may include requesting DNS information to be provided to the user device when establishing the communication session (as shown by reference number 620). For example, PGW 225 may request DNS information to be provided to user device 205 when establishing the communication session. In some implementations, PGW 225 may request the DNS information after PGW 225 receives the session request associated with user device 205.

In some implementations, PGW 225 may request the DNS information from AAA 230. For example, PGW 225 may send, to AAA 230, a request that includes the information that identifies user device 205 and the information that identifies the visited network. In this example, AAA 230 may receive the request for the DNS information, and may determine the DNS information based on the request, as described below. Additionally, or alternatively, PGW 225 may request the DNS information from another device (e.g., PCRF 240, HSS 235, etc.).

As further shown in FIG. 6A, process 600 may include determining roaming policy information associated with the user device (as shown by reference number 625). For example, AAA 230 may determine roaming policy information associated with user device 205. In some implementations, AAA 230 may determine the roaming policy information after AAA 230 receives a request for the DNS information associated with user device 205.

In some implementations, AAA 230 may determine the roaming policy information based on the information that identifies user device 205. For example, AAA 230 may receive the request for the DNS information that includes the information that identifies user device 205. In this example, AAA 230 may identify (e.g., based on the information that identifies user device 205 and information stored or accessible by AAA 230) subscription information, associated with the user device, that identifies a roaming policy to which user device 205 is assigned, and may determine (e.g., based on roaming policy information stored or accessible by AAA 230) roaming policy information that corresponds to the roaming policy. Additionally, or alternatively, AAA 230 may determine the roaming policy information based on communicating with one or more other devices, such as HSS 235 and/or PCRF 240.

In some implementations, the roaming policy information may include information that identifies one or more visited networks via which user device 205 may receive data roaming service, as described above with regard to FIG. 4.

As further shown in FIG. 6A, process 600 may include determining the DNS information, to be provided to the user device, based on the roaming policy information (as shown by reference number 630). For example, AAA 230 may determine the DNS information, to be provided to user device 205, based on the roaming policy information. In some implementations, AAA 230 may determine the DNS information after AAA 230 determines the roaming policy information associated with user device 205.

In some implementations, AAA 230 may determine the DNS information based on the roaming policy information and the information that identifies the visited network. For example, AAA 230 may determine, based on the roaming policy information and the information that identifies the visited network, whether user device 205 is permitted to send and/or receive data via the visited network. In some implementations, the DNS information may include information associated DNS server 245 to which user device 205 is to be directed when user device 205 communicates via the visited network, as described below. Additionally, or alternatively, the DNS information may include information associated with a network address to be assigned to user device 205 (e.g., such that traffic associated with user device 205 may be restricted, controlled, managed, etc. using a firewall policy), as described below. Additionally, or alternatively, the DNS information may include another type of information.

In some implementations, if AAA 230 determines that user device 205 is restricted from sending and/or receiving data via the visited network, then AAA 230 may determine (e.g., based on the roaming policy information) DNS information that includes a network address (e.g., an IP address) that identifies restricted DNS server 245 to which user device 205 is to be directed. Additionally, or alternatively, if AAA 230 determines that user device 205 is restricted from sending and/or receiving data via the visited network, then AAA 230 may determine (e.g., based on the roaming policy information) DNS information that includes information (e.g., an IP pool name) that identifies a restricted network address pool from which user device 205 is to be assigned a network address.

Alternatively, if AAA 230 determines that user device 205 is permitted to send and/or receive data via the visited network, then AAA 230 may determine (e.g., based on the roaming policy information) DNS information that includes a network address (e.g., an IP address) that identifies a standard DNS server 245 to which user device 205 is to be directed. Additionally, or alternatively, if AAA 230 determines that user device 205 is permitted to send and/or receive data via the visited network, then AAA 230 may determine (e.g., based on the roaming policy information) DNS information that includes information (e.g., an IP pool name) that identifies a standard network address pool from which user device 205 is to be assigned a network address.

As further shown in FIG. 6A, process 600 may include providing the DNS information (as shown by reference number 635). For example, AAA 230 may provide the DNS information. In some implementations, AAA 230 may provide the DNS information after AAA 230 determines the DNS information.

In some implementations, AAA 230 may provide the DNS information in the form of a response to the request for DNS information. For example, PGW 225 may send, to AAA 230, the request for DNS information associated with user device 205, as described above. Here, AAA 230 may determine the DNS information to be provided to user device 205, and may provide the DNS information as a response to the request provided by PGW 225.

As further shown in FIG. 6A, process 600 may include providing a session response including the DNS information (as shown by reference number 640). For example, PGW 225 may provide a session response including the DNS information. In some implementations, PGW 225 may provide the session response after PGW 225 receives the DNS information from AAA 230.

In some implementations, the session response may include the DNS information and/or other information associated with establishing the communication session associated with user device 205. In some implementations, PGW 225 may provide the session response to SGW 220. In some implementations, PGW 225 may also assign a network address to user device 205 (e.g., based on the information that identifies the network address pool from which user device 205 is to be assigned a network address and based on information, associated with the network address pool, stored by PGW 225).

As further shown in FIG. 6A, process 600 may include establishing the communication session associated with the user device and the visited network (as shown by reference number 645). For example, SGW 220 may establish the communication session associated with user device 205 and the visited network. In some implementations, SGW 220 may establish the communication session after SGW 220 receives the session response from PGW 225 (e.g., including the DNS information). In some implementations, SGW 220 may establish the communication session such that user device 205 may communicate via the visited network. In some implementations, SGW 220 may provide the DNS information to user device 205 during establishment of the communication session. User device 205 may receive the DNS information, and may be directed to DNS server 245 based on the DNS information, as described below.

Although FIG. 6A shows example operations of process 600, in some implementations, process 600 may include additional operations, fewer operations, different operations, or differently arranged operations than those depicted in FIG. 6A. Additionally, or alternatively, two or more of the operations of process 600 may be performed in parallel.

Figure 6B:
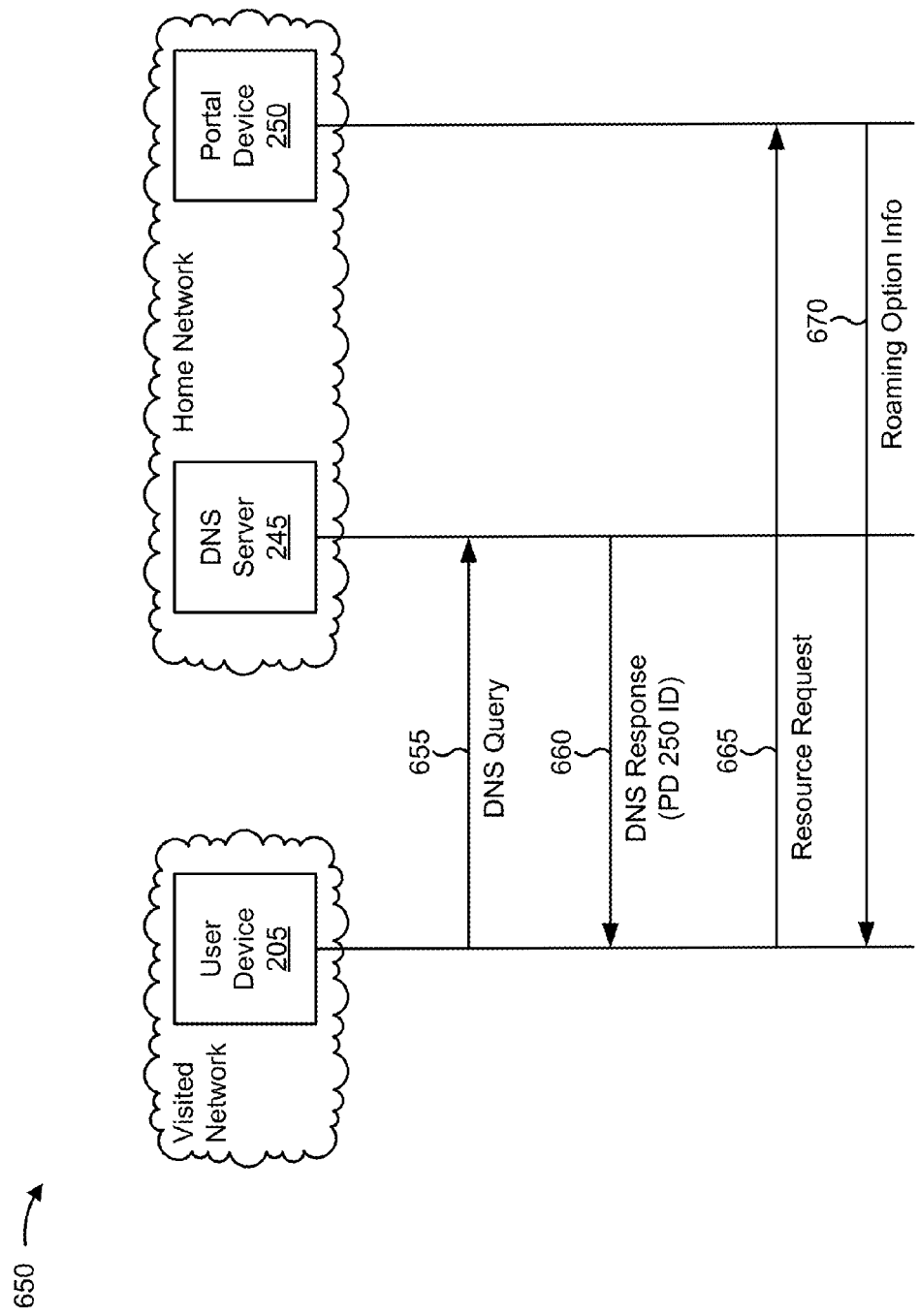
FIG. 6B is a call flow diagram of an example process for providing roaming option information associated with allowing a user device to authorize and/or enable data roaming service via a visited network.

FIG. 6B is a call flow diagram of an example process 650 for providing roaming option information associated with allowing a user device to authorize and/or enable data roaming service via a visited network. For the purposes of example process 650, assume that user device 205 is restricted from sending and/or receiving data via a visited network, and that user device 205 has receive DNS information that includes information that identifies restricted DNS server 245 to which user device 205 is to be directed. In some implementations, one or more operations of FIG. 6B may be performed by one or more devices of environment 200.

As shown in FIG. 6B, process 650 may include providing a DNS query to a restricted DNS server (as shown by reference number 655). For example, user device 205 may provide a DNS query to a restricted DNS server 245. In some implementations, user device 205 may provide the DNS query when user device 205 receives an indication (e.g., based on user input, based on a configuration of user device 205) to provide the DNS query.

In some implementations, user device 205 may provide the DNS query based on an indication associated with accessing a resource (e.g., a web page, a document, a file, etc.) via the visited network. For example, a user may provide user input that identifies a web address associated with a web page that the user wishes to access. In this example, assume that user device 205 stores a network address that identifies restricted DNS server 245 to which user device 205 is to provide DNS queries. Here, user device 205 may generate the DNS query, and may provide the DNS query such that the DNS query is received by restricted DNS server 245.

As further shown in FIG. 6B, process 650 may include providing a DNS response that includes information that identifies a portal device (as shown by reference number 660). For example, restricted DNS server 245 may provide a DNS response that includes information that identifies portal device 250. In some implementations, restricted DNS server 245 may provide the DNS response after restricted DNS server 245 receives the DNS query provided by user device 205.

In some implementations, restricted DNS server 245 may provide the DNS response based on information stored by restricted DNS server 245. For example, restricted DNS server 245 may store a network address (e.g., an IP address), that identifies portal device 250. In this example, restricted DNS server 245 may receive the DNS query, may generate a DNS response that includes the network address that identifies portal device 250, and may provide the DNS response to user device 205. In some implementations, restricted DNS server 245 may be configured such that any DNS response generated by restricted DNS server 245 includes the information that identifies portal device 250 (e.g., regardless of information included in the DNS request).

As further shown in FIG. 6B, process 650 may include providing a resource request to the portal device (as shown by reference number 665). For example, user device 205 may provide a resource request to portal device 250. In some implementations, user device 205 may provide the resource request after user device 205 receives the DNS response provided by restricted DNS server 245. Additionally, or alternatively, user device 205 may provide the resource request after user device 205 receives an indication that user device 205 is to provide the resource request.

In some implementations, the resource request may include information associated with accessing a resource. For example, the resource request may include a hypertext transfer protocol (HTTP) request associated with accessing a web page. In some implementations, user device 205 may generate and provide the resource request based on the DNS response received from restricted DNS server 245. For example, user device 205 may generate and provide the resource request such that the resource request is provided to portal device 250 as a result of receiving a response to the DNS query. In this way, user device 205 may be directed to portal device 250 regardless of the information included in the DNS request and/or the resource request provided by user device 205.

As further shown in FIG. 6B, process 650 may include providing roaming option information in response to the resource request (as shown by reference number 670). For example, portal device 250 may provide roaming option information in response to the resource request. In some implementations, portal device 250 may provide the roaming option information after portal device 250 receives the resource request provided by user device 205.

Roaming option information may include information associated with authorizing and/or enabling data roaming service for user device 205 in the visited network. In some implementations, the roaming option information may include information associated with authorizing data roaming service for a particular amount of data. For example, the roaming option information may identify a cost associated with authorizing data roaming for the particular amount of data (e.g., $25 for 100 megabytes (MB), $50 for 250 MB, etc.). Additionally, or alternatively, the roaming option information may include information associated with authorizing data roaming service for a particular amount of time. For example, the roaming option information my identify a cost associated with authorizing data roaming for the particular amount of time (e.g., $50 for one hour of data roaming, $200 for one week of data roaming, etc.). Additionally, or alternatively, the roaming option information may include information associated with enabling data roaming service for user device 205 (e.g., information associated with permanently enabling data roaming for the visited network). Additionally, or alternatively, the roaming option information may include information associated with a roaming policy that may be selected by the user in order to enable data roaming for the visited network (e.g., such that the user may select a new roaming policy for user device 205). Additionally, or alternatively, the roaming option information may include another type of information.

In some implementations, portal device 250 may provide the roaming option information based on receiving the resource request. For example, portal device 250 may receive the resource request, may determine (e.g., based on information stored by portal device 250) the roaming option information, and may provide the roaming option information to user device 205 (e.g., regardless of information included in the resource request). In this way, user device 205 may receive the roaming option information regardless of the resource requested by the user.

In some implementations, portal device 205 may communicate with user device 205 after providing the roaming option information, in order to authorize and/or enable data roaming for user device 205 for the communication session associated with the visited network. For example, user device 205 may display the roaming option information to the user, and the user may select (e.g., via a roaming option information user interface) a roaming option associated with authorizing and/or enabling data roaming. In this example, portal device 250 may receive information associated with the user selection, and may communicate with one or more other devices (e.g., HSS 235, PCRF 240) in order to update the subscription information, associated with user device 205, such that data roaming is authorized and/or enabled in the visited network based on the selected roaming option. Here, portal device 250 may then cause (e.g., by providing an indication to user device 205) the communication session to be terminated and re-established. User device 205 may return to operation 605 in order to re-establish the communication session and, during establishment of the communication session, user device 205 may receive DNS information that includes information that identifies a standard DNS server 245 (user device 205 may also be assigned to a network address from the standard network address pool). User device 205 may then send and/or receive data via the visited network in a standard fashion (e.g., based on communicating with standard DNS server 245).

In some implementations, PGW 225 may monitor and/or track data roaming activity via the visited network. For example, PGW 225 may monitor a quantity of data sent and/or received via the visited network, and may enforce a data roaming threshold (e.g., a maximum amount of data, a time period for data roaming service, etc.) associated with the roaming option. In this example, PGW 225 may cause user device 205 to be directed to restricted DNS server 245 when the data roaming threshold has been satisfied.

Although FIG. 6B shows example operations of process 650, in some implementations, process 650 may include additional operations, fewer operations, different operations, or differently arranged operations than those depicted in FIG. 6B. Additionally, or alternatively, two or more of the operations of process 650 may be performed in parallel.

Figure 7A:
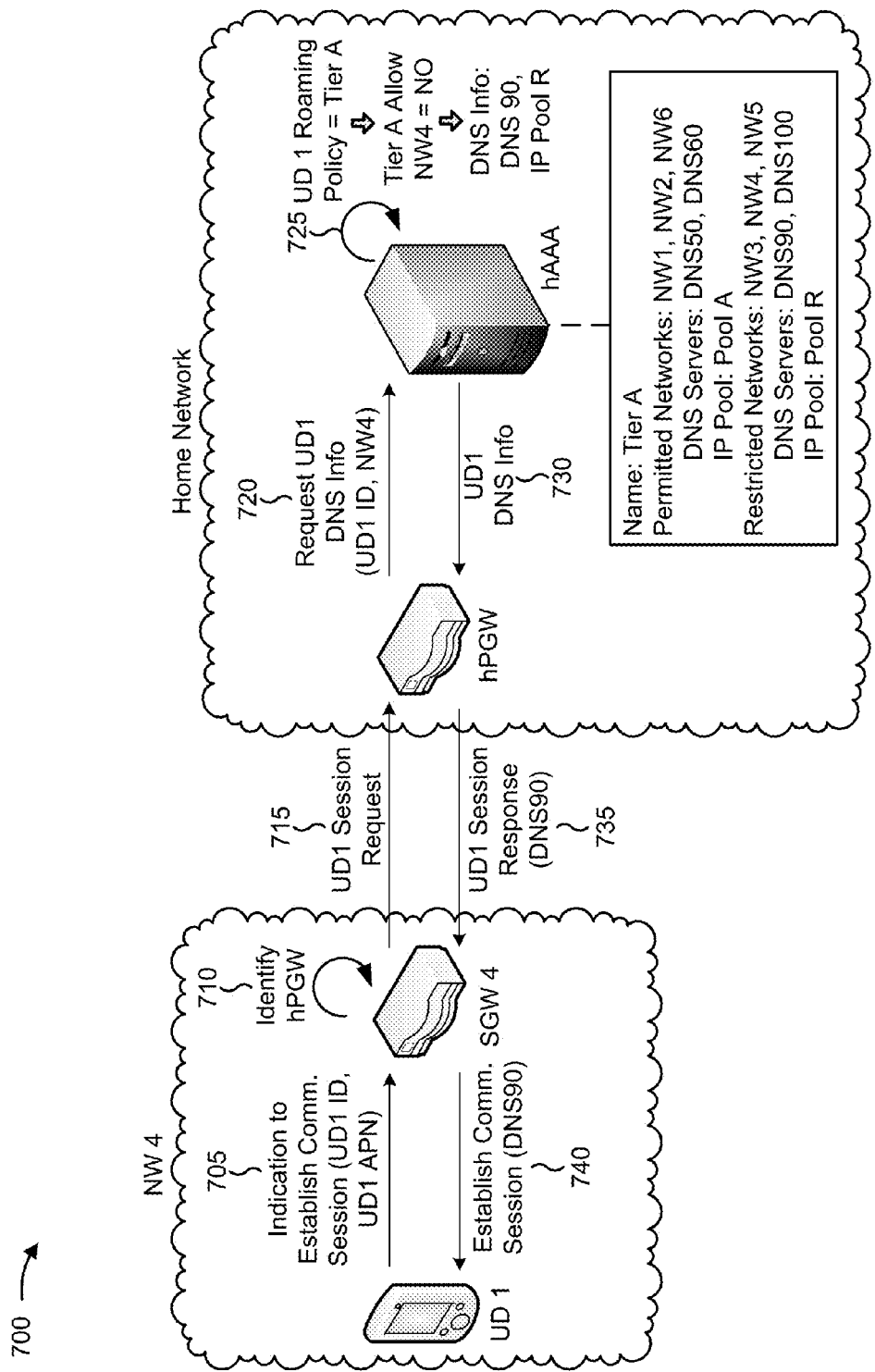
FIGS. 7A-7C are diagrams of an example implementation relating to the example process shown in FIG. 6.
Figure 7B:
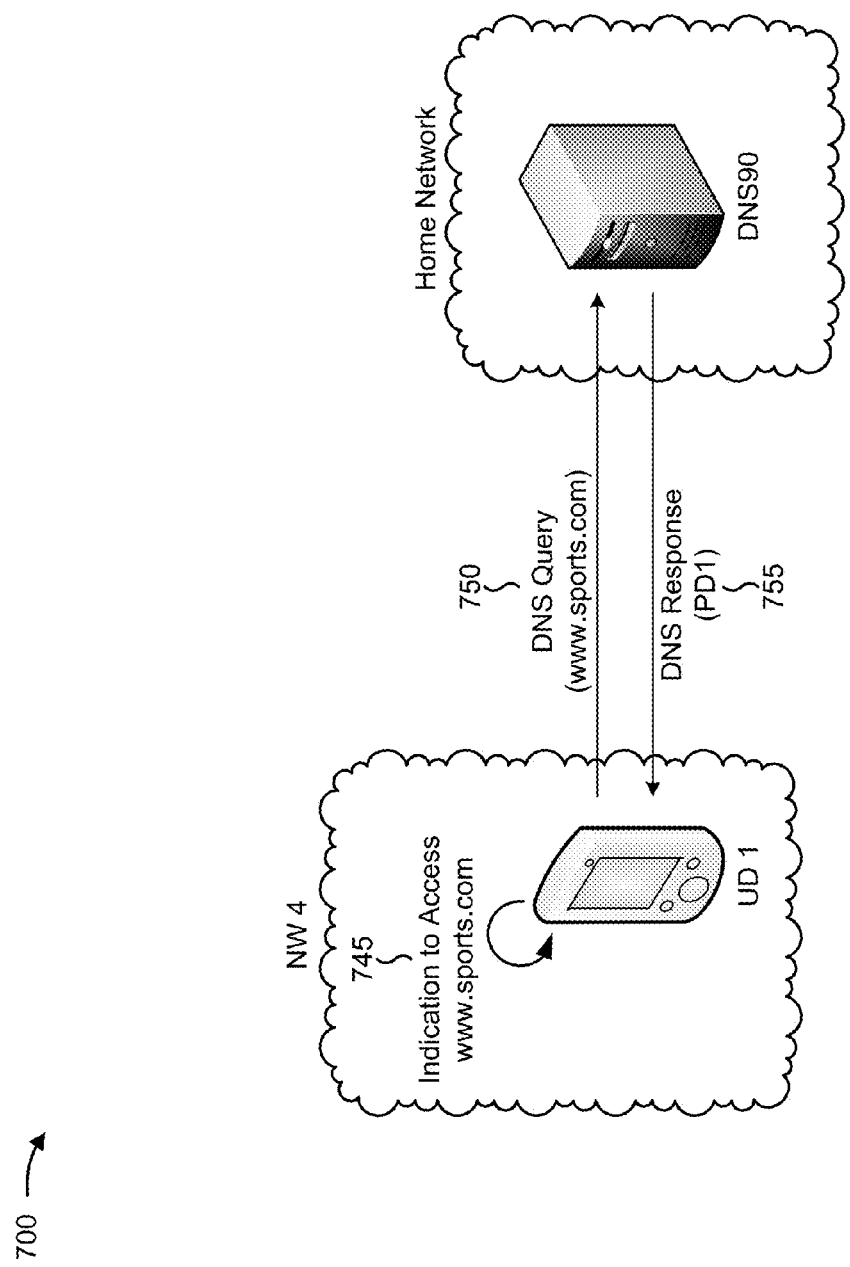
Figure 7C:
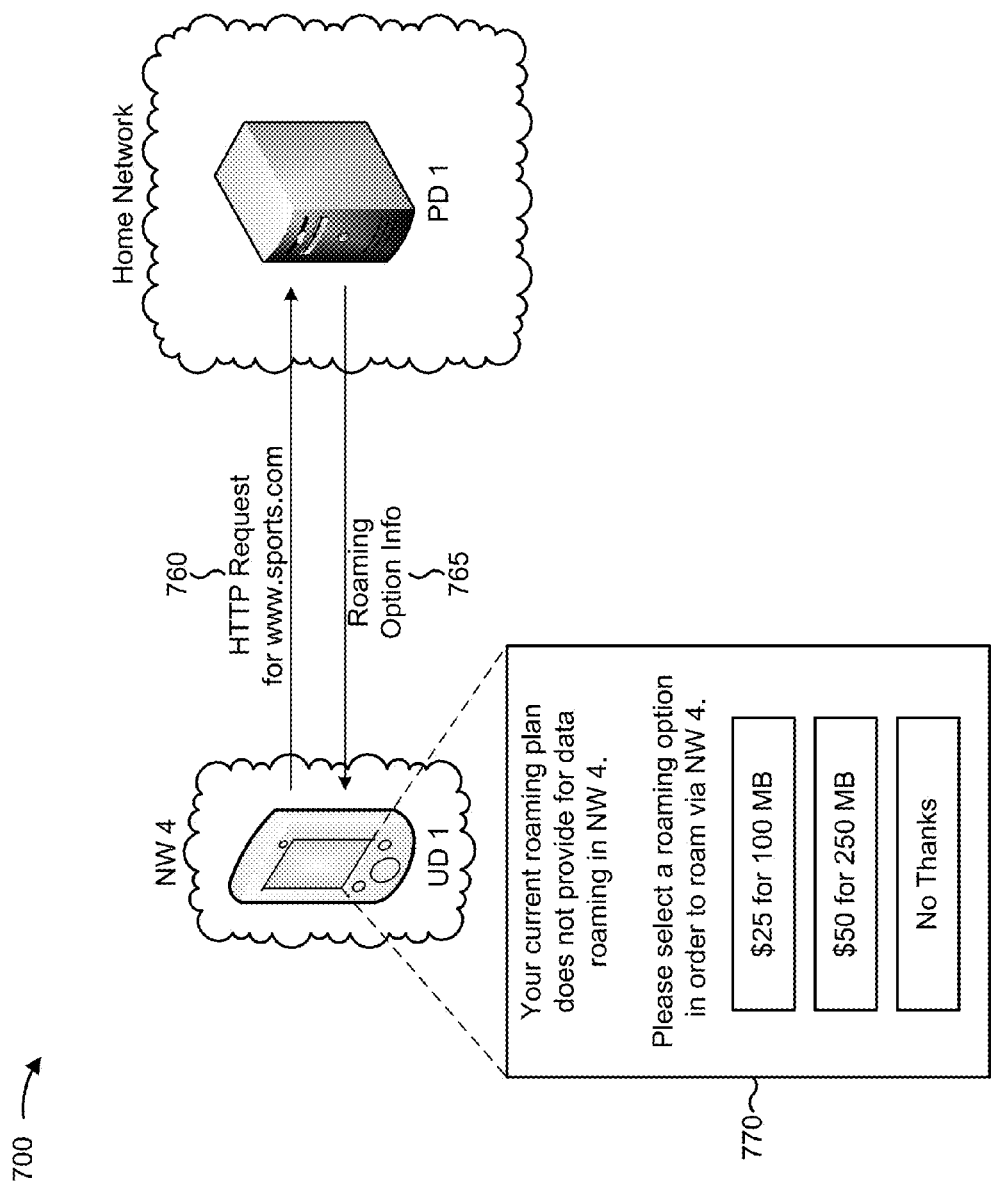

FIGS. 7A-7C are diagrams of an example implementation 700 relating to example processes 600 and 650 shown in FIGS. 6A and 6B, respectively. For the purposes of example implementation 700, assume that AAA 230 (e.g., hAAA) stores roaming policy information associated with a roaming policy (e.g., tier A) assigned to user device 205 (e.g., UD1) located within a geographic area associated with a visited network (e.g., NW4).

As shown in FIG. 7A, and by reference number 705, UD1 may provide, to SGW 220 included in the visited network (e.g., SGW4), an indication to establish a communication session with UD1 and NW4. As shown, the indication may include information associated with UD1, such as a user device identifier and an APN associated with UD1. As shown by reference number 710, SGW4 may identify (e.g., based on a DNS query provided by SGW4) PGW 225 associated with a home network of UD1 (e.g., hPGW). As shown by reference number 715, SGW 4 may provide, to hPGW, a session request associated with UD1, that includes the information associated with UD1. As shown by reference number 720, hPGW may request, from hAAA, DNS information to be provided to UD1. As shown by reference number 725, hAAA may receive the request for the DNS information, and may identify (e.g., based on the information associated with UD1 and information stored and/or accessible by hAAA) the tier A roaming policy as being assigned to UD1. As shown, hAAA may then determine, based on roaming policy information stored or accessible by hAAA, that the tier A roaming policy restricts UD1 from sending and/or receiving data via NW4. As further shown, hAAA may also determine, based on the tier A roaming policy information, DNS information, to be provided to UD1, that identifies a restricted DNS server 245 (e.g., DNS90) to which UD1 is to be directed, and a restricted network address pool (e.g., IP pool R) from which UD1 is to be assigned a network address. As shown by reference number 730, hAAA may provide the DNS information to hPGW. As shown by reference number 735, hPGW may receive the DNS information, and may provide a session response based on the DNS information (e.g., hPGW may provide the DNS90 identifier and may assign UD1 to a network address from IP pool R). As shown by reference number 740, SGW4 may receive the session response, and may establish the communication session. During establishment of the communication session, SGW4 may provide the DNS90 identifier and/or the restricted network address (e.g., from IP pool R) to UD1.

As shown in FIG. 7B, and by reference number 745, UD1 may receive an indication associated with accessing a web page (e.g., www.sports.com) via the communication session associated with NW4. As shown by reference number 750, UD1 may provide, based on receiving the indication, a DNS query associated with the web page. As shown, the DNS query may be provided to DNS90 (e.g., based on the DNS information received by UD1 during establishment of the communication session). As shown by reference number 755, DNS90 may receive the DNS query, and may provide a DNS response that includes information that identifies portal device 250 (e.g., PD1) to which UD1 is to be directed.

As shown in FIG. 7C, and by reference number 760, UD1 may receive the DNS response, and may provide, to PD1, an HTTP request associated with the web page. As shown by reference number 765, PD1 may receive the HTTP request, and may provide, to UD1, roaming option information associated with authorizing and/or enabling data roaming service for UD1 in NW4. As shown by reference number 770, UD1 may receive the roaming option information, and may display, to the user, information indicating that UD1 is restricted from sending and/or receiving data via NW4 (e.g., "Your current roaming plan does not provide for data roaming in NW4. Please select a roaming option in order to roam via NW4") and the roaming option information (e.g., $25 for 100 MB, $50 for 250 MB, No Thanks) for selection by the user.

Assuming that the user selects a roaming option associated with authorizing and/or enabling data roaming in NW4, PD1 may communicate with one or more other devices (e.g., HSS 235, PCRF 240) in order update the subscription information, associated with UD1, such that data roaming is authorized and/or enabled in NW4. PD1 may then cause (e.g., by providing an indication to UD1) the communication session to be terminated and reset. UD1 may cause the communication session to be re-established (e.g., in the manner described above) and, during establishment of the communication session, UD1 may receive updated DNS information that includes information that identifies standard DNS server 245 (e.g., identified in the tier A roaming policy), and may be assigned a network address from a standard network address pool (e.g., identified in the tier A roaming policy). UD1 may then send and/or receive data via NW4 in a standard fashion (e.g., based on communicating with standard DNS server 245).

As indicated above, FIGS. 7A-7C are provided merely as an example. Other examples are possible and may differ from what was described with regard to FIGS. 7A-7C.

Figure 8:
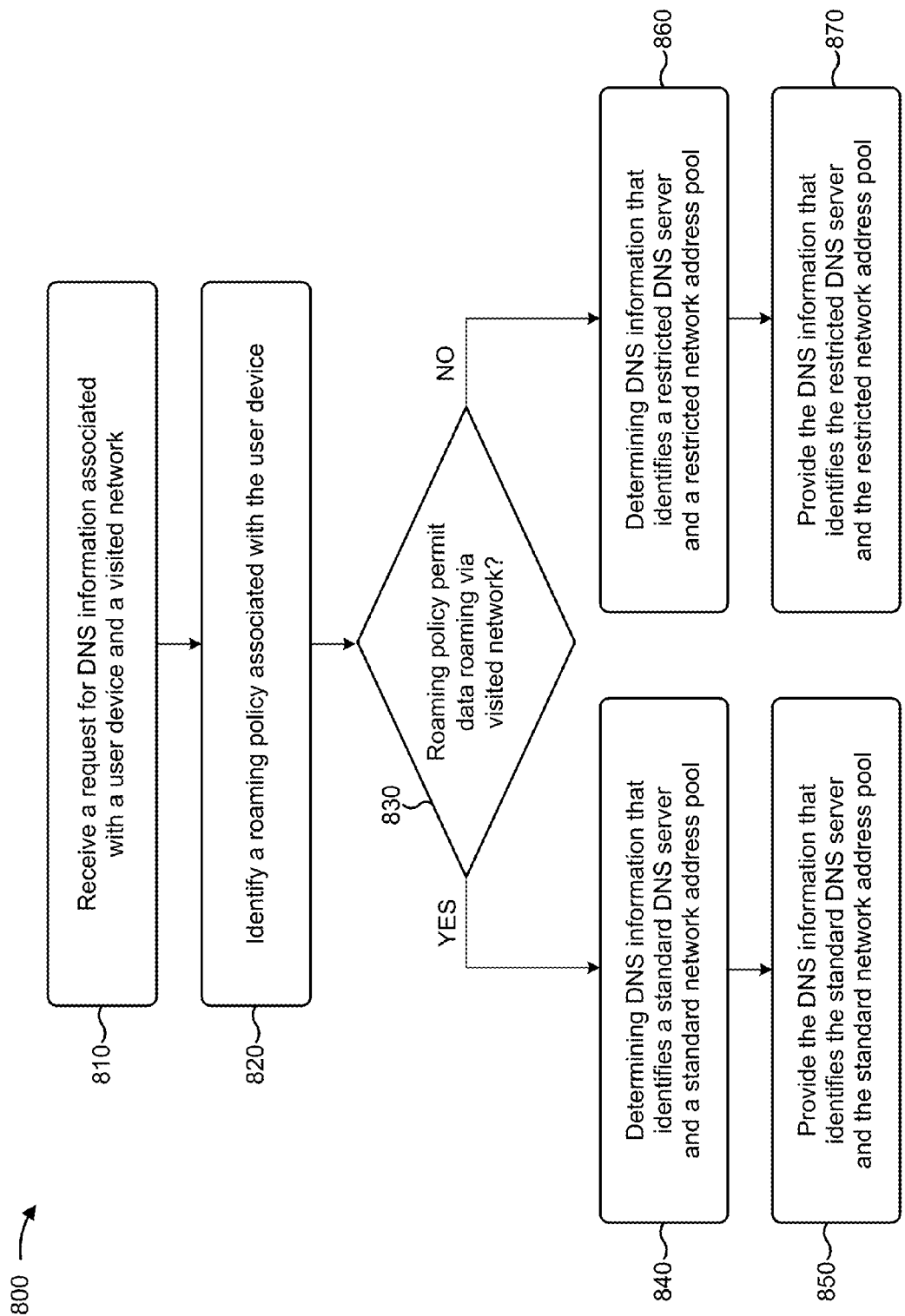
FIG. 8 is a flow chart of an example process for providing DNS information, associated with a user device communicating via a visited network, based on determining whether the user device is permitted to send and/or receive data via the visited network.

FIG. 8 is a flow chart of an example process 800 for providing DNS information, associated with a user device communicating via a visited network, based on determining whether the user device is permitted to send and/or receive data via the visited network. In some implementations, one or more process blocks of FIG. 8 may be performed by AAA 230. In some implementations, one or more process blocks of FIG. 8 may be performed by another device or a group of devices separate from or including AAA 230, such as HSS 235 and/or PCRF 240.

As shown in FIG. 8, process 800 may include receiving a request for DNS information associated with a user device and a visited network (block 810). For example, AAA 230 may receive a request for DNS information associated with user device 205 and the visited network, as described above.

As further shown in FIG. 8, process 800 may include identifying a roaming policy associated with the user device (block 820). For example, AAA 230 may identify the roaming policy associated with the user device, as described above.

As further shown in FIG. 8, process 800 may include determining whether the roaming policy permits the user device to send and/or receive data via the visited network (block 830). For example, AAA 230 may determine whether the roaming policy permits user device 205 to send and/or receive data via the visited network, as described above.

As further shown in FIG. 8, if the roaming policy permits the user device to send and/or receive data via the visited network (block 830—YES), then process 800 may include determining DNS information that identifies a standard DNS server and a standard network address pool (block 840). For example, if the roaming policy permits user device 205 to send and/or receive data via the visited network, then process 800 may include determining DNS information that identifies standard DNS server 245 and a standard network address pool, as described above.

As further shown in FIG. 8, process 800 may include providing the DNS information that identifies the standard DNS server and the standard network address pool (block 850). For example, AAA 230 may provide the DNS information that identifies standard DNS server 245 and the standard network address pool, as described above.

As further shown in FIG. 8, if the roaming policy restricts the user device from sending and/or receiving data via the visited network (block 830—NO), then process 800 may include determining DNS information that identifies a restricted DNS server and a restricted network address pool (block 860). For example, if the roaming policy restricts user device 205 from sending and/or receiving data via the visited network, then process 800 may include determining DNS information that identifies restricted DNS server 245 and a restricted network address pool, as described above.

As further shown in FIG. 8, process 800 may include providing the DNS information that identifies the restricted DNS server and the restricted network address pool (block 870). For example, AAA 230 may provide the DNS information that identifies restricted DNS server 245 and the restricted network address pool, as described above.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

Implementations described herein may allow a user device to be directed to a portal device, associated with authorizing and/or enabling data roaming service for the user device, based on DNS information provided to the user device and determined based on a roaming policy corresponding to the user device (e.g., without relying on a packet inspection technique).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
one or more processors to:
receive a request for domain name system (DNS) information to be provided to a user device communicating via a visited network,
the visited network being a network that is not a home network of the user device;
identify, based on receiving the request, roaming policy information associated with the user device;

determine, based on the roaming policy information, that the user device is restricted from sending or receiving data via the visited network;
determine DNS information to be provided to the user device,
the DNS information including information that identifies a restricted DNS server to which the user device is to be directed;
provide the DNS information to the user device,
the DNS information being provided to the user device to cause the user device to be directed to the restricted DNS server, and
the user device being directed to the restricted DNS server in order to permit a user of the user device to authorize the user device to send or receive data via the visited network;
determine that the user device is permitted to send or receive data via the visited network based on the user device being directed to the restricted DNS server; and
provide other DNS information to the user device,
the other DNS information including information that identifies a standard DNS server to which the user device is to be directed, and
the other DNS information being provided to the user device to cause the user device to be directed to the standard DNS server, in order to allow the user device to send or receive data via the visited network.

2. The device of claim 1, where the one or more processors are further to:
determine information that identifies a restricted network address pool,
the restricted network address pool being associated with a group of restricted network addresses from which the user device is to be assigned a network address; and
provide the information that identifies the restricted network address pool such that the user device is assigned a restricted network address of the group of restricted network addresses.

3. The device of claim 1, where the one or more processors, are further to:
identify a roaming policy, associated with the user device, based on information that identifies the user device,
the information that identifies the user device being included in the request for DNS information; and
where the one or more processors, when identifying the roaming policy information associated with the user device, are to:
identify the roaming policy information based on information associated with the roaming policy.

4. The device of claim 1, where the one or more processors are further to:
identify, based on the roaming policy information, a set of visited networks via which the user device is permitted to send or receive data,
the roaming policy information including information that identifies the set of visited networks;
determine, based on information that identifies the visited network, that the set of visited networks does not include the visited network; and
when determining that the user device is restricted from sending or receiving data via the visited network, the one or more processors are to:
determine that the user device is restricted from sending or receiving data via the visited network based on determining that the set of visited networks does not include the visited network.

5. The device of claim 1, where the one or more processors are further to:
identify, based on the roaming policy information, a set of visited networks via which the user device is restricted from sending or receiving data,
the roaming policy information including information that identifies the set of visited networks;
determine, based on information that identifies the visited network, that the set of visited networks includes the visited network; and
when determining that the user device is restricted from sending or receiving data via the visited network, the one or more processors are to:
determine that the user device is restricted from sending or receiving data via the visited network based on determining that the set of visited networks includes the visited network.

6. The device of claim 1, where the one or more processors are further to:
receive the roaming policy information,
the roaming policy information including:
information that identifies a set of visited networks via which the user device is restricted from sending or receiving data,
information that identifies a set of visited networks via which the user device is permitted to send or receive data,
information that identifies the restricted DNS server, and
information that identifies the standard DNS server; and
store the roaming policy information.

7. The device of claim 1, where the one or more processors, after providing the DNS information, are further to:
obtain updated subscription information associated with the user device,
the updated subscription information indicating that the user device is permitted to send or receive data via the visited network;
receive another request for DNS information to be provided to the user device communicating via the visited network; and
determine, based on the updated subscription information, that the user device is permitted to send or receive data via the visited network.

8. A non-transitory computer-readable medium storing instructions, the instructions comprising:
one or more instructions that, when executed by one or more processors, cause the one or more processors to:
receive a request for domain name system (DNS) information to be provided to a user device communicating via a visited network,
the visited network being a network that is not a home network of the user device;
determine, based on receiving the request, roaming policy information associated with the user device;
determine, based on the roaming policy information, that the user device is restricted from receiving a data roaming service via the visited network;
identify restricted DNS information to be provided to the user device,
the restricted DNS information including information identifying a restricted DNS server to which the user device is to be directed;
transmit the restricted DNS information, the restricted DNS information being transmitted to cause the user device to be directed to the restricted DNS server, the user device being directed to the restricted DNS server to allow a user of the user device to authorize or enable the user device to receive the data roaming service via the visited network;

determine that the user device is permitted to send or receive data via the visited network based on the user device being directed to the restricted DNS server;

determine standard DNS information to be provided to the user device, the standard DNS information including information that identifies a standard DNS server to which the user device is to be directed; and provide the standard DNS information to the user device, the standard DNS information being provided to the user device to cause the user device to be directed to the standard DNS server, and the user device being directed to the standard DNS server in order to allow the user device to receive the data roaming service via the visited network.

9. The non-transitory computer-readable medium of claim 8, where the instructions further comprise:

one or more instructions that, when executed by the one or more processors, cause the one or more processors to:

determine information that identifies a restricted network address pool, the restricted network address pool including a group of restricted network addresses from which the user device is to be assigned a network address; and provide the information that identifies the restricted network address pool such that the user device is assigned a restricted network address of the group of restricted network addresses.

10. The non-transitory computer-readable medium of claim 8, where the instructions further comprise:

one or more instructions that, when executed by the one or more processors, cause the one or more processors to:

identify a roaming policy, to which the user device is assigned, based on a user device identifier associated with the user device, the user device identifer being included in the request for DNS information; and where the one or more instructions, that cause the one or more processors to determine the roaming policy information associated with the user device, cause the one or more processors to:

determine the roaming policy information based on information associated with the roaming policy.

11. The non-transitory computer-readable medium of claim 8, where the instructions further comprise:

one or more instructions that, when executed by the one or more processors, cause the one or more processors to:

identify, based on the roaming policy information, a group of visited networks via which the user device is permitted to receive the data roaming service, the roaming policy information including information that identifies the group of visited networks;

determine, based on information that identifies the visited network, that the group of visited networks does not include the visited network; and where the one or more instructions, that cause one or more processors to determine that the user device is restricted from receiving the data roaming service via the visited network, cause the one or more processors to:

determine that the user device is restricted from receiving the data roaming service via the visited network based on determining that the group of visited networks does not include the visited network.

12. The non-transitory computer-readable medium of claim 8, where the instructions further comprise:

one or more instructions that, when executed by the one or more processors, further cause the one or more processors to:

identify, based on the roaming policy information, a group of visited networks via which the user device is restricted from receiving the data roaming service, the roaming policy information including information that identifies the group of visited networks;

determine, based on information that identifies the visited network, that the group of visited networks includes the visited network; and where the one or more instructions, that cause one or more processors to determine that the user device is restricted from receiving the data roaming service via the visited network, cause the one or more processors to:

determine that the user device is restricted from receiving the data roaming service via the visited network based on determining that the group of visited networks includes the visited network.

13. The non-transitory computer-readable medium of claim 8, where the instructions further comprise:

one or more instructions that, when executed by the one or more processors, cause the one or more processors to:

receive the roaming policy information, the roaming policy information including:

information that identifies a group of visited networks via which the user device is restricted from receiving the data roaming service, information that identifies a group of visited networks via which the user device is permitted to receive the data roaming service, information that identifies the restricted DNS server, and information that identifies the standard DNS server; and store the roaming policy information.

14. The non-transitory computer-readable medium of claim 8, where the instructions further comprise: one or more instructions that, when executed by the one or more processors, cause the one or more processors to:

obtain updated subscription information associated with the user device, the updated subscription information indicating that the user device is permitted to receive the data roaming service via the visited network;

receive another request for DNS information to be provided to the user device communicating via the visited network; and determine, based on the updated subscription information, that the user device is permitted to receive the data roaming service via the visited network.

15. A method, comprising:
receiving, by a device, an indication to determine domain name system (DNS) information to be provided to a user device communicating via a visited network,
the visited network being a network that is not a home network of the user device;
identifying, by the device and based on receiving the indication, roaming policy information associated with the user device;
determining, by the device and based on the roaming policy information, that the user device is restricted from communicating via the visited network;
determining, by the device, restricted DNS information to be provided to the user device,
the restricted DNS information including information that identifies a restricted DNS server to which the user device is to be directed, and
the restricted DNS information including information that identifies a restricted network address pool from which the user device is to be assigned a network address;
providing, by the device, the restricted DNS information to the user device,
the restricted DNS information being provided to cause the user device to be directed to the restricted DNS server,
the user device being directed to the restricted DNS server in order to allow a user of the user device to select a roaming option associated with permitting the user device to send or receive data via the visited network;
determining, by the device and based on the user device being directed to the restricted DNS server, that the user device is permitted to communicate via the visited network;
determining, by the device, standard DNS information to be provided to the user device,
the standard DNS information including information that identifies a standard DNS server to which the user device is to be directed, and
the standard DNS information including information that identifies a standard network address pool from which the user device is to be assigned a network address; and
providing, by the device, the standard DNS information to the user device,
the standard DNS information being provided to cause the user device to be directed to the standard DNS server, and
the user device being directed to the standard DNS server in order to allow the user device to communicate via the visited network.

16. The method of claim 15, further comprising:
identifying a roaming policy, associated with the user device, based on information that identifies the user device,
the information that identifies the user device being included in the indication to determine the restricted DNS information; and
where identifying the roaming policy information associated with the user device comprises:
identifying the roaming policy information based on information associated with the roaming policy.

17. The method of claim 15, further comprising:
identifying, based on the roaming policy information, a set of visited networks via which the user device is permitted to communicate,
the roaming policy information including information that identifies the set of visited networks;
determining, based on information that identifies the visited network, that the set of visited networks does not include the visited network; and
where determining that the user device is restricted from communicating via the visited network comprises:
determining that the user device is restricted from communicating via the visited network based on determining that the set of visited networks does not include the visited network.

18. The method of claim 15, further comprising:
identifying, based on the roaming policy information, a set of visited networks via which the user device is restricted from communicating,
the roaming policy information including information that identifies the set of visited networks;
determining, based on information that identifies the visited network, that the set of visited networks includes the visited network; and
where determining that the user device is restricted from communicating via the visited network comprises:
determining that the user device is restricted from communicating via the visited network based on determining that the set of visited networks includes the visited network.

19. The method of claim 15, further comprising:
receiving the roaming policy information,
the roaming policy information including:
information that identifies a set of visited networks via which the user device is restricted from communicating,
information that identifies a set of visited networks via which the user device is permitted to communicate,
information that identifies the restricted DNS server, and
information that identifies the standard DNS server; and
storing the roaming policy information.

20. The method of claim 15, further comprising:
obtaining, after providing the restricted DNS information, updated subscription information associated with the user device,
the updated subscription information indicating that the user device is permitted to communicate via the visited network;
receiving another indication to determine DNS information to be provided to the user device communicating via the visited network; and
determining, based on the updated subscription information, that the user device is permitted to communicate via the visited network.

* * * * *